United States Patent
Chechik et al.

(10) Patent No.: US 8,819,006 B1
(45) Date of Patent: Aug. 26, 2014

(54) RICH CONTENT FOR QUERY ANSWERS

(71) Applicant: Google Inc., Mountain View, CA (US)

(72) Inventors: Gal Chechik, Los Altos, CA (US); Eyal Segalis, Tel Aviv (IL); Yaniv Leviathan, Tel Aviv (IL); Yoav Tzur, Tel Aviv (IL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/145,086

(22) Filed: Dec. 31, 2013

(51) Int. Cl.
*G06F 7/00* (2006.01)
*G06F 17/30* (2006.01)

(52) U.S. Cl.
CPC .................. *G06F 17/3053* (2013.01)
USPC ........................................................ 707/728

(58) Field of Classification Search
USPC ........................................................ 707/728
See application file for complete search history.

(56) References Cited

U.S. PATENT DOCUMENTS

| | | | |
|---|---|---|---|
| 7,460,735 B1 | 12/2008 | Rowley | |
| 7,627,556 B2 | 12/2009 | Liu | |
| 2003/0069880 A1* | 4/2003 | Harrison et al. | 707/3 |
| 2011/0179021 A1* | 7/2011 | Wen et al. | 707/723 |
| 2011/0191336 A1* | 8/2011 | Wang et al. | 707/728 |
| 2012/0109943 A1 | 5/2012 | Yang | |
| 2012/0233196 A1 | 9/2012 | Wu | |
| 2013/0006972 A1 | 1/2013 | Ramos | |

OTHER PUBLICATIONS

WO/2009/002864 A2. Riezler et al. Dec. 31, 2008.*
Bosma, "Image Retrieval Supports Multimedia Authoring," Human Media Interaction, [online] [Retrieved on Dec. 31, 2013] Retrieved from URL: http://doc.utwente.nl/655671/1/lecems05.pdf, 6 pages.
Theune et al., "Questions, Pictures, Answers: Introducing Pictures in Question-Answering Systems," University of Twente, The Netherlands, [online] [Retrieved on Dec. 31, 2013]; Retrieved from URL: http://wwwhome.ewi.utwente.nl/~theune/PUBS/Questions_Pictures_Answers.pdf, 15 pages.

* cited by examiner

*Primary Examiner* — Charles Lu
(74) *Attorney, Agent, or Firm* — Fish & Richardson P.C.

(57) ABSTRACT

Methods and systems for providing rich content with an answer to a question query. A method includes receiving a query determined to be a question query and a corresponding answer generated in response to the question query, generating a contextual query that includes an element relating to the question query and an element relating to the answer; submitting the contextual query to a rich content search process and receiving data specifying a first set of rich content items responsive to the contextual query, determining first rich content item in the first set of rich content items that meet a context condition that is indicative of a rich content item providing contextual information of both elements of the question query and the answer query; and preferentially selecting from the first content items relative to the second rich content items to be provided as one or more answer rich content items.

19 Claims, 6 Drawing Sheets

RICH CONTENT FOR QUERY ANSWERS

BACKGROUND

This specification relates to search system query processing.

The Internet provides access to a wide variety of resources, such as image files, audio files, video files, and web pages. A search system can identify resources in response to queries submitted by users and provide information about the resources in a manner that is useful to the users.

Users of search systems are often searching for an answer to a specific question, rather than a listing of resources. For example, users may want to know what the weather is in a particular location, a current quote for a stock, the capital of a state, etc. When queries that are in the form of a question are received, some search systems may perform specialized search operations in response to the question format of the query. For example, some search systems may provide information responsive to such queries in the form of an "answer," such as information provided in the form of a "one box" to a question.

SUMMARY

In general, one innovative aspect of the subject matter described in this specification can be embodied in methods that include the actions of receiving a query determined to be a question query and a corresponding answer generated in response to the question query, the answer determined to be responsive to the question query, wherein each of the question query and the answer has one or more terms; generating a contextual query that includes an element relating to the question query and an element relating to the answer; submitting the contextual query to a rich content search process and receiving data specifying a first set of rich content items responsive to the contextual query, the rich content items ranked according to an order that is indicative of the relevance of each rich content item to a query for which the set was generated; determining first rich content item in the first set of rich content items that meet a context condition that is indicative of a rich content item providing contextual information of both elements of the question query and the answer query; and preferentially selecting from the first content items relative to the second rich content items to be provided as one or more answer images. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Rich content, such as an image, audio, or a video, can be provided with an answer to a question, and the rich content is selected such that it conveys to the user information regarding both the content of the question and the answer. This helps ensure that rich information provided to the user for an answer is responsive to the question and consistent with the answer provided.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Users often use search systems to seek for "answers" rather than a breadth of information. An answer is a fact or relation that is responsive to a question. A "question query" differs from an informational query in that the question query seeks the answer, while the informational query is a request for a variety of different types of information for a subject. For example, the question query "How high is Pikes Peak" is a structured query that clearly requests a fact—the height of Pikes Peak. A search system can detect the structured nature of the query and interpret the query as a question query, and provide, in response to the query, a particular result that provides an answer to the question, and optionally other results.

A rich content question processing system provides an answer for a question query and rich information that is specific to the question query and the answer. The system receives a question query and a corresponding answer generated in response to the question query. Each of the question query and the answer has one or more terms. The system generates a contextual query that includes an element relating to the question query and an element relating to the answer. For example, the contextual query can include at least one or more terms from the question query and one or more terms from the answer. Alternatively, the contextual query can specify entities identified by the question query and answer, or related terms derived from the question query and answer.

The rich content question processing system submits the contextual query to a rich content search process, such as an image search process. Other rich content, such as videos and audio, can also be searched and processed. For brevity, image rich content is used as an example.

The image search process specifies a first set of images responsive to the contextual query, and ranks the images according to an order that is indicative of the relevance of each image to the question query. The first set is provided to the rich content question processing system, which then, in turn, determines first images and second images in the first set. The first images are images that meet a context condition that is indicative of an image providing contextual information of both terms of the question and terms of the answer, and the second images are images that do not meet the context condition.

The first and second images may be selected, in some implementations, based in part on respective image sets for the question query and answer query and a comparison of those image sets to the image set for the contextual query. In other implementations, the first and second images may be selected based in part on image labels of each respective image.

These features and additional features are described in more detail in the sections that follow. The features are described in the context of resources originating from web sites; however, the features are not limited to applications only in the context of an Internet search engine. For example, the features can be implemented in knowledge graph that includes rich content and that includes data describing the rich content. More generally, the features described below can be implemented in any data processing system in which rich content, terms and entities are mapped by their corresponding relations and searchable by such mapping.

Example Operating Environment

Figure 1:
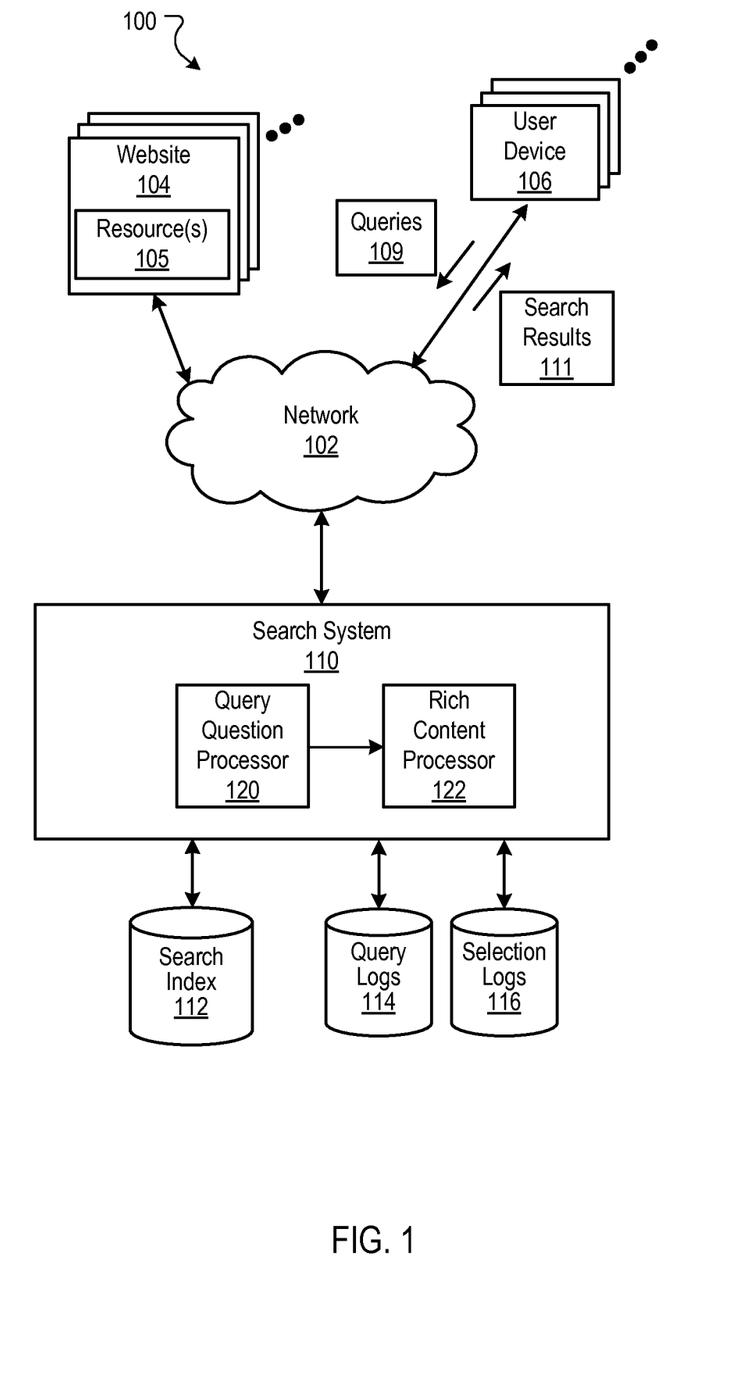
FIG. 1 is an illustration of an environment in which rich content is provided with an answer to a question query.

FIG. 1 is an illustration of an environment 100 in which rich content is provided with an answer to a question query. A computer network 102, such as the Internet, connects publisher websites 104, user devices 106, and a search system 110. The online environment 100 may include many thousands of publisher websites 104 and user devices 106.

A publisher website 104 includes one or more resources 105 associated with a domain and hosted by one or more servers in one or more locations. Generally, a website is a collection of web pages formatted in hypertext markup language (HTML) that can contain text, images, multimedia content, and programming elements, for example, scripts. Each website 104 is maintained by a content publisher, which is an entity that controls, manages and/or owns the website 104.

A resource is any data that can be provided by a publisher website 104 over the network 102 and that has a resource address, e.g., a uniform resource locator (URL). Resources may be HTML pages, electronic documents, images files, video files, audio files, and feed sources, to name just a few. The resources may include embedded information, e.g., meta information and hyperlinks, and/or embedded instructions, e.g., client-side scripts.

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102. The web browser can enable a user to display and interact with text, images, videos, music and other information typically located on a web page at a website on the world wide web or a local area network.

To facilitate searching of these resources 105, the search system 110 crawls the publisher websites 104 and indexes the resources provided by the publisher websites 104. The index data are stored in a resource index 112.

The user devices 106 submit search queries to the search system 110. The search queries are submitted in the form of a search request that includes the search request and, optionally, a unique identifier that identifies the user device 106 that submits the request. The unique identifier can be data from a cookie stored at the user device, or a user account identifier if the user maintains an account with the search system 110, or some other identifier that identifies the user device 106 or the user using the user device.

In response to the search request, the search system 110 uses the index 112 to identify resources that are relevant to the queries. The search system 110 identifies the resources in the form of search results and returns the search results to the user devices 106 in search results page resource. A search result is data generated by the search system 110 that identifies a resource or provides information that satisfies a particular search query. A search result for a resource can include a web page title, a snippet of text extracted from the web page, and a resource locator for the resource, e.g., the URL of a web page.

The search results are ranked based on scores related to the resources identified by the search results, such as information retrieval ("IR") scores, and optionally a separate ranking of each resource relative to other resources (e.g., an authority score). The search results are ordered according to these scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher of the website 104 hosting the resource receives the request for the resource from the user device 106 and provides the resource to the requesting user device 106.

In some implementations, the queries submitted from user devices 106 are stored in query logs 114. Selection data for the queries and the web pages referenced by the search results and selected by users are stored in selection logs 116. The query logs 114 and the selection logs 116 define search history data 117 that include data from and related to previous search requests associated with unique identifiers. The selection logs represent actions taken in response to search results provided by the search system 110. Examples of such actions include clicks on the search results. The query logs 114 and selection logs 116 can be used to map queries submitted by user devices to resources that were identified in search results and the actions taken by users when presented with the search results in response to the queries. In some implementations, data are associated with the identifiers from the search requests so that a search history for each identifier can be accessed. The selection logs 116 and query logs 114 can thus be used by the search system to determine the respective sequences of queries submitted by the user devices, the actions taken in response to the queries, and how often the queries have been submitted.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Question Queries

As described above, some queries are in the form of question, or in the form of an implicit question. For example, the query "capital of California" is in the form of an implicit question "What is the capital of California?" Likewise, a question may be specific, as in the query "What is the capital of California?" The search system 110 includes a query question processor 120 that utilizes processes to determine if a query is a query question, and, if so, whether there is an answer that is responsive to the question. The query question processor 120 can use a variety of different algorithms to determine whether a query is a question and whether there is a particular answer responsive to the question. For example, the query question processor 120 may utilize language models, machine learned processes, knowledge graphs, grammars, the search results and resources referenced by the search results, or combinations thereof, to determine question queries and answers.

When a query is determined to be a question query and there is a responsive answer, the query question processor 120 invokes the rich content processor 122 which, in turn, identifies rich content to be provided with the answer. In the example implementations described below, the rich content that is provided is an image or set of images. However, other types of rich content, e.g., non-textual content, such as video data, audio data, etc., can be provided.

Figure 2:
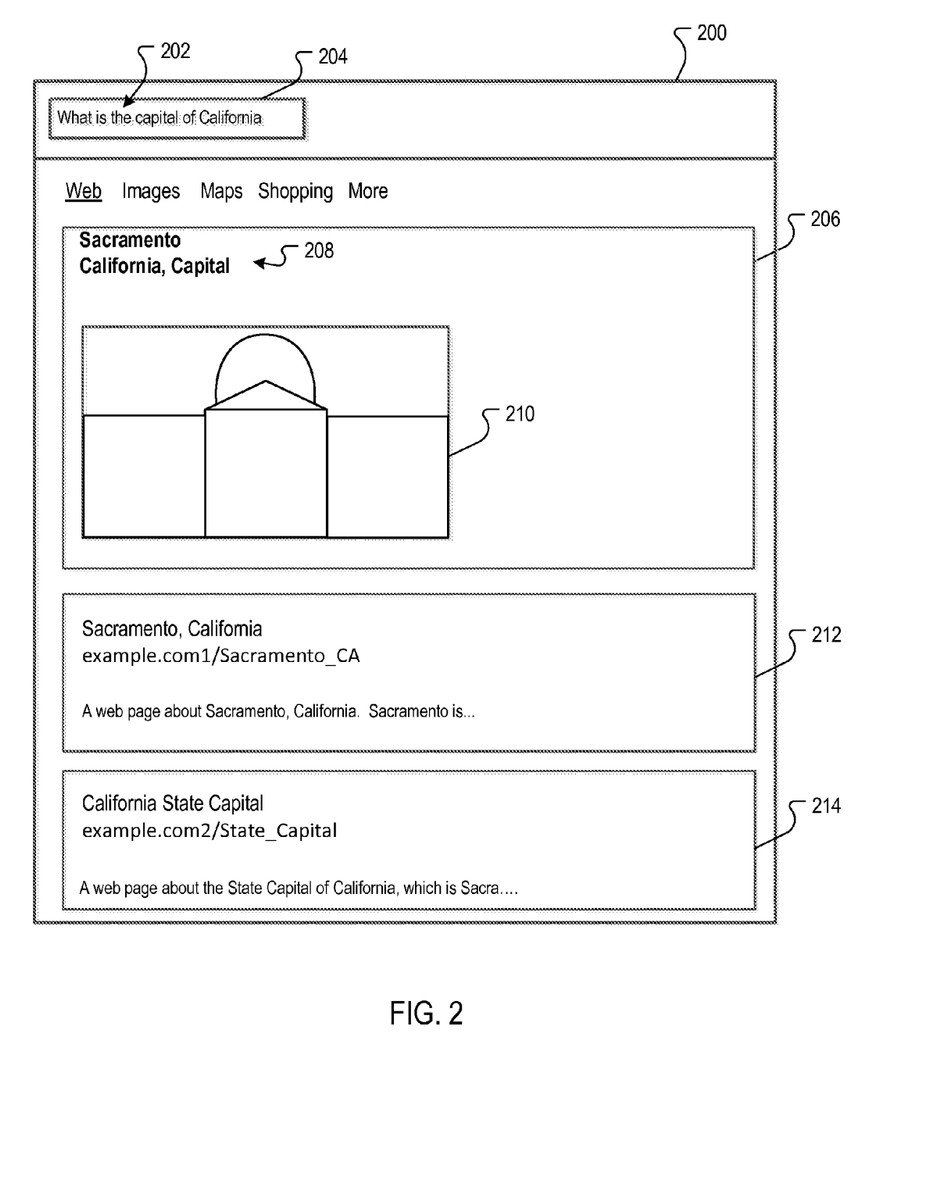
FIG. 2 is an illustration of an example user interface in which rich content is provided with an answer to a question query.

FIG. 2 is an illustration of an example user interface 200 in which rich content is provided with an answer to a question query. The user interface 200 is a search results interface, and the query 202 "What is the capital of California" has been input in the input field 204. The query question processor 120 identifies the query as a question query, and also identifies the answer "Sacramento." The search system 110, in connection with the query question processor 120, provides an answer box 206 in response to the determination that the query is a question query and that an answer is identified. The answer box 206 includes text data 208 that describes the answer "Sacramento." Additionally, the answer box 206 includes one or more images as rich content—in this case, one image 210 that is an image of the capital building of California. Additional information, such as search results 212 and 214, can also be provided on the search results page.

Figure 3:
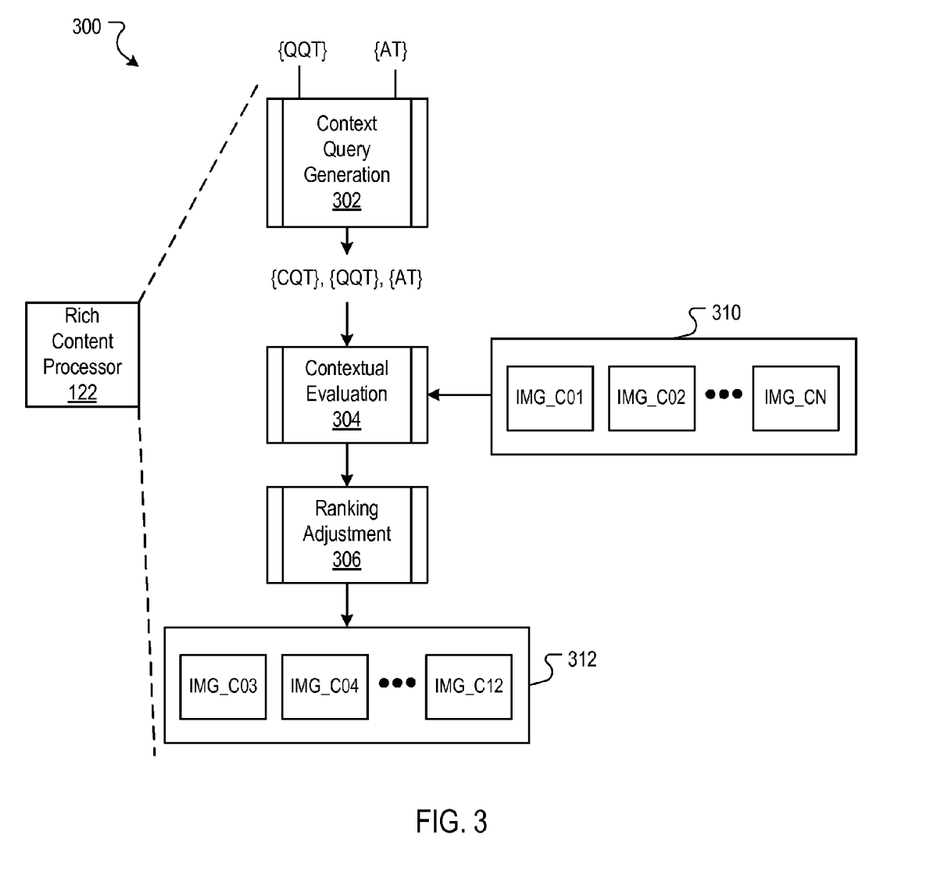
FIG. 3 is a system flow diagram for providing rich content with an answer to a question query.
Figure 4:
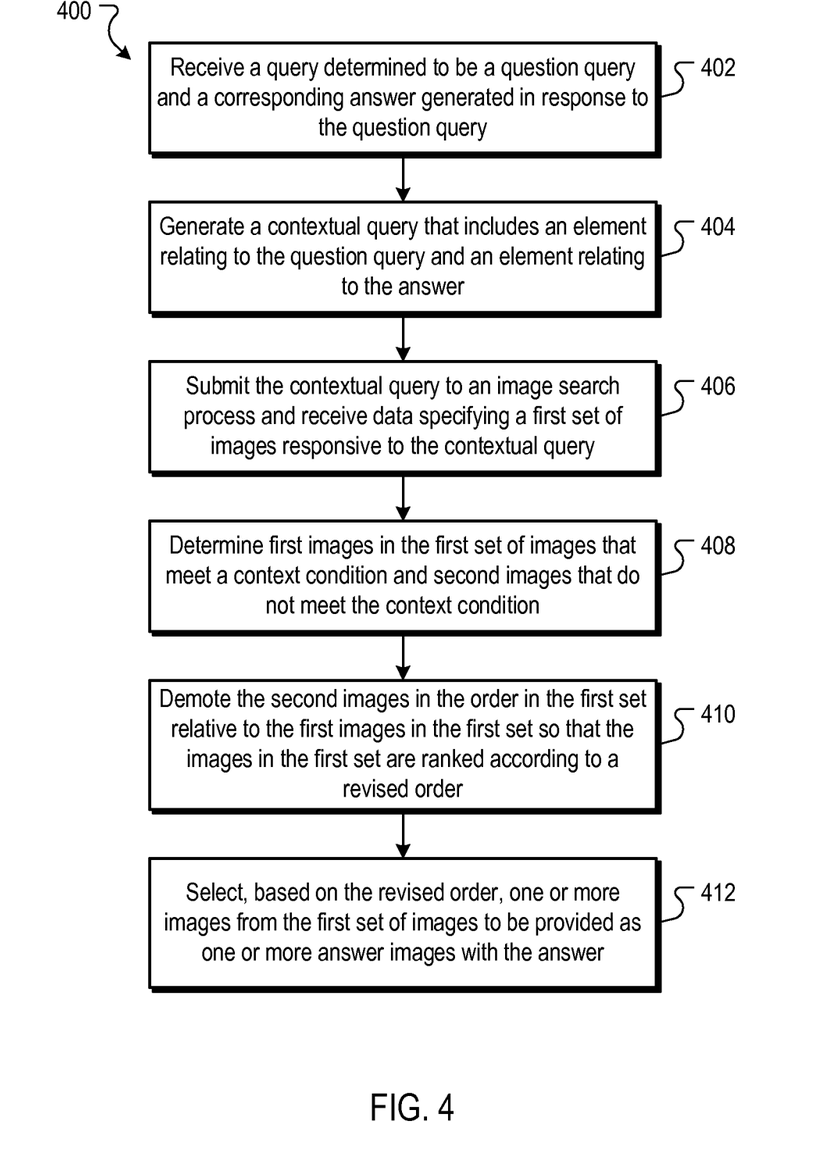
FIG. 4 is a flow diagram of an example process for providing rich content with an answer to a question query.

The selection of the rich content image 210 is described with reference to FIG. 3, which is a system flow diagram 300 for providing rich content with an answer to a question query. The system flow diagram 300 describes a process implemented in the rich content processor 122. One such process is shown in FIG. 4, which is a flow diagram of an example process 400 for providing rich content with an answer to a question query. The system flow diagram 300 is thus described in conjunction with the description of FIG. 4.

The rich content processor 122 receives a query determined to be a question query and a corresponding answer generated in response to the question query (402). For example, when the query question processor 120 determines a query is a question and there is a responsive answer, the question query and the answer are provided to the rich content processor 122. For example, for the question query "Capital of California," the answer is "Sacramento", and both the question query and the answer are provided to the rich content processor. Each of the question query and the answer have one or more terms, which are represented by question query terms {QQT} and answer terms {AT}, respectively, in FIG. 3.

The rich content processor generates a contextual query that includes an element relating to the question query and an element relating to the answer (404). For example, the contextual query can include at least one or more terms from the question query and one or more terms from the answer. Alternatively, the contextual query can specify entities identified by the question query and answer, or related terms (synonyms, term expansions, etc.) derived from the terms of the question query and terms of the answer. In some implementations, the context query is a concatenation of question query and the answer.

For this example, a contextual query that includes terms of the question query and terms of the answer is used. For example, for the question query "Capital of California" and the answer is "Sacramento," the context query is "Capital of California Sacramento." Other ways of generating a context query can also be used, such removing stop words, substituting terms, etc. The contextual query is represented by the terms {CQT} in FIG. 3, and is generated by a context query generation process step 302.

The rich content processor 122 submits the contextual query to an image search process and receives data specifying a first set of images responsive to the contextual query (406). For example, as shown in FIG. 3, a first set of N images 310 is received from an image search process. The images are ranked according to an order that is indicative of the relevance of each image to a query for which the set was generated. In this example, the images are ranked according to an order that is indicative of the relevance of each image to contextual query.

The rich content processor determines first images in the first set of images that meet a context condition and second images that do not meet the context condition (408). The context condition is a condition that, when satisfied by an image, is indicative of an image providing contextual information of both elements of the question query and the answer query. For example, the condition, when met, is indicative of an image providing contextual information of both terms of the question and terms. Some images in the set 310 may meet the condition, while others may not. Those that do are classified as first images, and those that do not are classified as second images. A contextual evaluation step 304 performs the analysis to determine first and second images.

Two examples of content conditions are conditions based on rich content sets, e.g., other sets of images responsive to one or more of the question query or the answer, and conditions based on rich content labels, e.g., tags, descriptors and other text that may describe an image. These conditions are described in the sections below with reference to FIGS. 5A and 5B and FIGS. 6A and 6B.

The rich content processor 122 then preferentially selects from the first images relative to the second images to be provided as one or more answer images. For example, the rich content processor 122 demotes the second images in the order in the first set relative to the first images in the first set so that the images in the first set are ranked according to a revised order (410). For example, as shown in FIG. 3, the set of images 312 includes the images from the set 310, but the ranking of the images has been adjusted, as indicated by the different images notations at the respective first, second and Nth ordinal positions. In some implementations, rankings of first images in the first set 310 may be boosted relative to rankings of second images; or rankings of second images in the first set 310 may be demoted relative to rankings of first images; or a combination of promotions and demotions may occur. The promotions and demotions may be fixed, e.g., a fixed number or ordinal positions, or may vary based on adjustment of underlying relevance scores that are used to order the images according to the rank. A ranking adjustment step 306 performs the analysis to determine first and second images. Example adjustment processes are described with reference to FIGS. 5A and 5B and FIGS. 6A and 6B below.

The rich content processor selects, based on the revised order, one or more images from the first set of images to be provided as one or more answer images with the answer (412). For example, the rich content processor may select the top-ranked image in the adjusted order, e.g., IMG_CO3, to provide with the answer in the answer box 206, or may select several images, e.g., IMG_CO3 and IMG_CO4, to provide with the answer.

Demotion Based on Rich Content Sets

Figure 5A:
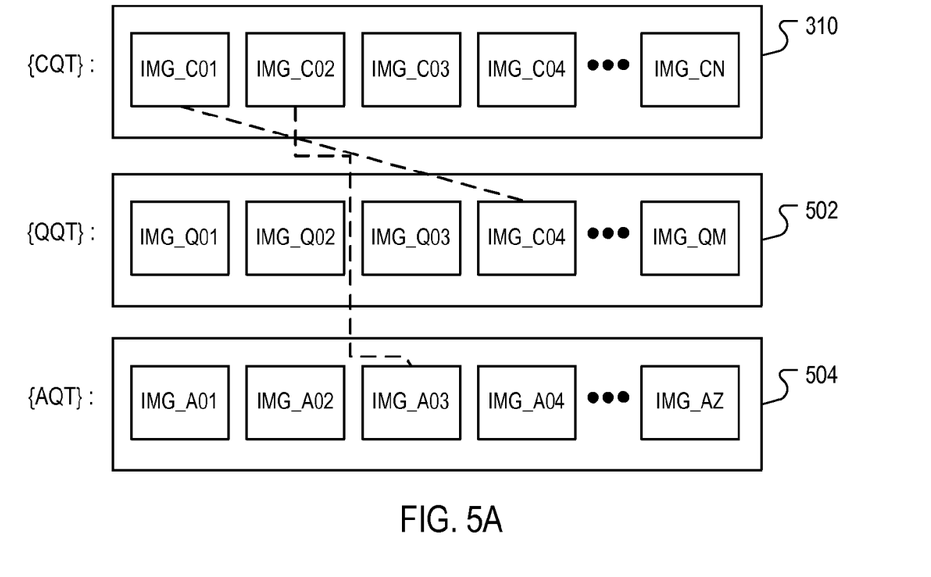
FIG. 5A is a diagram of multiple image sets that are used to adjust the ranking of one of the image sets.

In this example implementation, additional images sets are generated for the question query and the answer, and are represented by a respective second and third set. This is shown in FIG. 5A, which is a diagram of multiple image sets that are used to adjust the ranking of one of the image sets. The image set 310 is the first set that is responsive to the context query {CQT}; the image set 502 is the second set that is responsive to the question query {QQT}; and the image set 504 is the third set that is responsive to the answer {AQT} when the answer is run as a query on the image search engine. Matching images that are the same are indicted by dashed connections.

In this implementation, images that only appear in the first set 310 are classified as first images, and images that appear in one or more of the second or third sets are classified as second images. Demoting images in the first set 310 that also appear in one or more of the second set 502 or third set 504 is based on the rationale that such images are more contextually relative to either the question query or the answer, but less relevant to the entire context that accounts for both the contextual query and the answer. For example, for the question query "Capital of California," the answer "Sacramento" and the contextual query "Capital of California Sacramento," the following images in the sets are the same: IMG_CO1 and IMG_Q04. Likewise, the images IMG_CO2 and IMG_A03 are the same. Image IMG_Q02 may be, for example, an image of a map of the state of California, and IMG_A03 may be a logo of a professional sports team based in the city of Sacramento.

In some implementations, an image appearing in the first set and only in the second or third, but not both the second and third sets, is demoted more than an image appearing in all three sets. In these implementations, first images appearing only in the first set are preferred over second images appearing in all sets, and these second images are preferred over third images appearing in only one of the first and second sets or the first and third sets.

While both images IMG_C04 and IMG_A04 convey visual information related to the city of Sacramento, the context of the context query "Capital of California Sacramento" is indicative of a particular interest in the city of Sacramento and its function as a State Capital. Thus, an image in the first set that may appear in either the second or third set may be less contextually relevant than an image in the first set that does not appear in either of the second or third sets. This relevance consideration is based, in part, on the fact that a search system may take into account many features in addition to textual query terms when ranking rich content, such as click rates, popularity of an underlying page, etc. Accordingly, demoting images in the first set that also appear in one or both of the second set or third set tends to surface images that are more relevant to a context of both the question and the answer.

Figure 5B:
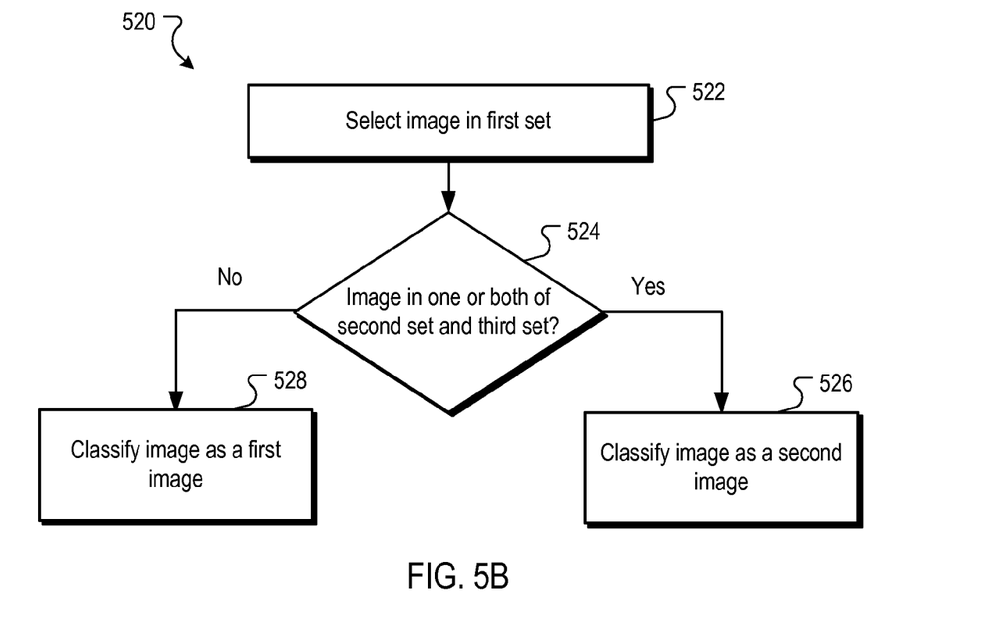
FIG. 5B is a flow diagram of an example process for classifying images in a set of images as either first or second images, where the second images are demoted in a ranking relative to the first images.

FIG. 5B is a flow diagram of an example process 520 for classifying images in a set of images as either first or second images based on the rich content sets of FIG. 5A. In operation, the process 520 is done for each image in the first set (or each of top Q images in the first set, where Q is 100, 200, etc.).

The rich content processor 122 selects an image in the first set of images (522). For example, the rich content processor 122 selects the image IMG_CO1.

The rich content processor 122 determines whether the image is in one or both of the second set of images and the third set of images (524). For example, the rich content process 122 determines, from an image identifier, whether the images IMG_C01 is in the second set 502 or the third set 504. Here, the IMG_CO1 matches IMG_CO4.

If the image is in one or both of the second set of images and the third set of images, then the rich content processor classifies the image as a second image (526). Here, because the image IMG_CO1 matches IMG_CO4, it is classified as a second image. On the next iteration, the image IMG_CO2 will also be classified as a second image, as that image matches the image IMG_A03.

If, on the other hand, the image is not in either of the second set of images and the third set of images, then the rich content processor classifies the image as a first image (526). For example, on the third iteration, the image IMG_CO3 will be classified as a first image, as it does not match an image in one or both of the sets 502 and 504.

After the images are classified into first images and second images, the second images are demoted relative to the first images. A demotion may be fixed, or may be variable based on one or more factors. For example, each second image included in only one of the second set or third set may be demoted by a first demotion factor, such as a fixed number of ordinal positions or by a scalar that is used to reduce is corresponding relevancy score. However, each second image included in both the second set and third set may be demoted by a second demotion factor that is less than the first demotion factor. The second demotion factor may also be a fixed number of ordinal positions or a scalar, but smaller than the first demotion factor. The smaller value reflects that if the image is in both the first and second set, it may be more contextually relevant to the entire context of the question and the answer than an image that is only in one of the first and second sets.

Another demotion process can optionally take into account the ordinal position of the matching image in the second and/or third sets. The second image in the first set is then demoted in proportion to its ordinal position in the order in the other of the second set or third of images in which it is included. If the image is in both the second set and the third set, then an average of its ordinal positions can be used, or the greatest of the ordinal positions can be used. In some implementations, the more relevant the image is in the other set, the greater its demotion may be in the first set.

Other demotion processes can also be used.

Demotion Based on Rich Content Labels

Figure 6A:
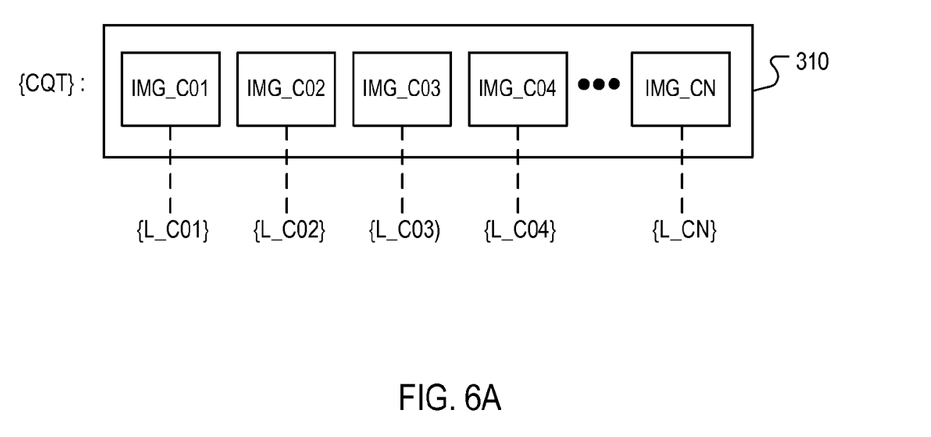
FIG. 6A is a diagram of an image set and labels that are used to adjust the ranking of images in the image set.

In this example implementation, image labels for each image are processed to determine whether the image is a first image or a second image that is to be demoted relative to the first image. The labels are shown in FIG. 6A, which is a diagram of the first image set 310 and labels that are used to adjust the ranking of one of the image sets. The image set 310 is the first set that is responsive to the context query {CQT}. The labels {L_Cx} are label associated with each image. The labels may be predefined, and may include content such as metadata, textual content associated with the image that describes the subject of the image, text from web pages that include the image, text from links that link to the image, and so on.

Additionally or alternatively, the labels may include text describing entities detected in the image by means of computer vision techniques/image processing techniques. For example, famous landmarks and faces of famous people may be detected in an image and text describing the entities, such as names of the landmarks or persons, are associated with the image.

Generally, if an image has labels that match terms of both the question query and the answer, then it is classified as a first image. If, on the other hand, an image has labels that match terms of only one of the question query or the answer, then it is classified as a second image. Demoting the second images tends to surface the first images that are more relevant to a context of both the question and the answer.

In a variation of this implementation, if an image has labels that match terms of both the question query and the answer, and also additional labels that match other entities, then it is classified as a second image. Doing so focuses the contextual relevance on the question and the answer. For example, assume the question query is "Who was the Vice President of Bill Clinton." Because the contextual focus of the question query and the answer is Al Gore, who was the Vice President under Bill Clinton, images that include labels for only Al Gore or only Bill Clinton will be classified as second images. Likewise, images that include labels for both Al Gore and Bill Clint, and also labels for other government officials, will also be classified as second images. Images that include labels for only Al Gore and Bill Clinton are classified as first images.

Figure 6B:
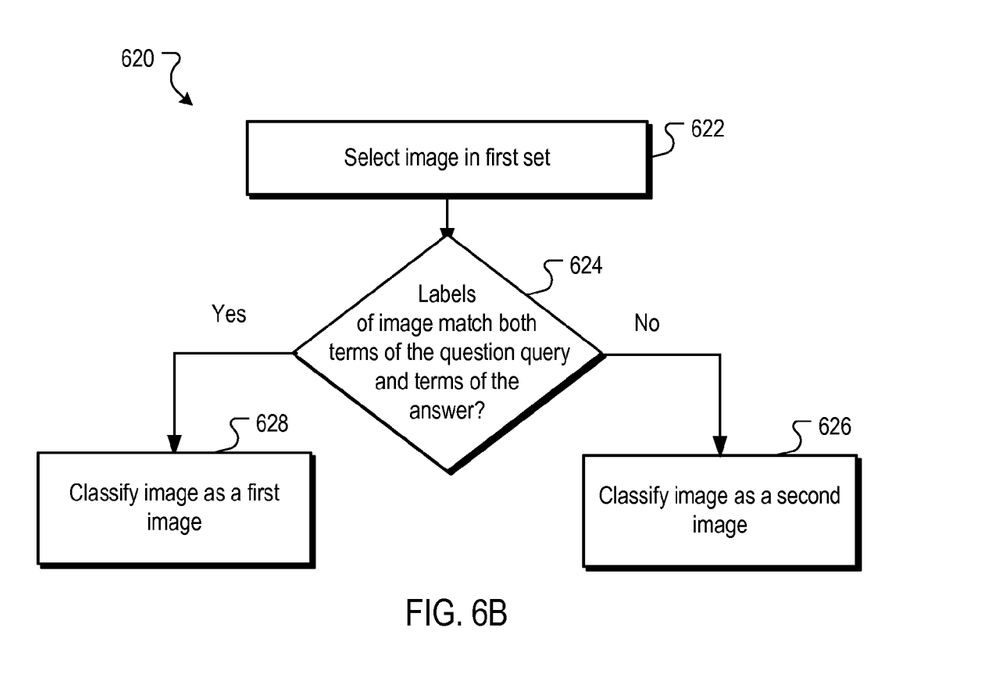
FIG. 6B is a flow diagram of another example process for classifying images in a set of images as either first or second images, where the second images are demoted in a ranking relative to the first images.

FIG. 6B is a flow diagram of an example process 620 for classifying images in a set of images as either first or second images based on the labels of FIG. 6A. In operation, the process 620 is done for each image in the first set (or each of top Q images in the first set, where Q is 100, 200, etc.).

The rich content processor selects an image in the first set of images (622). For example, the rich content processor 122 selects the image IMG_CO1.

The rich content processor 122 determines whether labels of the image match both terms of the question query and terms of the answer (624). For example, the question query is "Husband of Ima Starr" and the answer is "Hesa Starr." Assume the first image is a head shot of Hesa Starr; the rich content processor 122 would thus determine that the image does not have labels that match both terms of the question query and terms of the answer.

However, assume the image IMG_CO2 is an image of both Ima Starr and Hesa Starr. For this image, the rich content processor 122 would determine that the image does have labels that match both terms of the question query and terms of the answer.

If the labels of the image do not match both terms of the question query and terms of the answer, then the rich content processor classifies the image as a second image (626). In this example, image IMG_CO1 is classified as a second image.

If, on the other hand, the labels of the image match both terms of the question query and terms of the answer, then the rich content processor classifies the image as a first image (628). In this example, image IMG_CO2 is classified as a first image.

After the images are classified into first images and second images, the second images are demoted relative to the first images. As described above, a demotion may be fixed, or may be variable based on one or more factors. For example, each second image that includes a label that matches an answer term but does not include a label that matches a question term may be demoted by a smaller factor than a second image that includes a label that matches a question term but does not include a label that matches an answer term. This reflects that the images that include a label that matches an answer term but do not include a label that matches a question term are still responsive to the answer and will thus provide some level a satisfaction of the user's informational need.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    receiving, by a data processing apparatus, a query determined to be a question query and a corresponding answer generated in response to the question query, the answer determined to be responsive to the question query, wherein each of the question query and the answer has one or more terms;
    generating, by the data processing apparatus, a contextual query that includes an element relating to the question query and an element relating to the answer;
    submitting, by the data processing apparatus, the contextual query to a rich content search process and receiving data specifying a first set of rich content item responsive to the contextual query, the rich content items ranked according to an order that is indicative of the relevance of each rich content item to a query for which the set was generated, the submitting comprising submitting each of the question query, the answer, and the contextual query to the rich content item search process and receiving data specifying the first set of rich content items responsive to the contextual query, a second set of rich content items responsive to the question query, and a third set of rich content items responsive to the answer, wherein each set of rich content items differs from each other respective set of rich content items, and the rich content items in each set of rich content items are ranked according to an order that is indicative of the relevance of each rich content item to a query for which the set was generated;

determining, by the data processing apparatus, first rich content items in the first set of rich content items that meet a context condition that is indicative of a rich content item providing contextual information of both elements of the question query and the answer, query, the determining first rich content items comprising determining from the data specifying the first, second and third sets of rich content items, first rich content items in the first set that that are not included in both of the second set and the third set and second rich content items in the first set that are included in at least one of the second set or third set;

determining, by the data processing apparatus, second rich content items in the first set of rich content items that do not meet the context condition; and selecting rich content items from one or more of the first rich content items and the second rich content items, wherein the selected one or more rich content items are provided as one or more answer rich content items;

wherein the rich content items are non-textual content.

2. The method of claim 1, wherein:

generating a contextual query that includes an element relating to the question query and an element relating to the answer comprises generating a contextual query that includes at least one or more terms from the question query and one or more terms from the answer;

the context condition that is indicative of a rich content item providing contextual information of both elements of the question query and the answer is a condition that is indicative of a rich content item providing contextual information of terms of the question query and terms of the answer.

3. The method of claim 2, wherein selecting rich content items from one or more of the first rich content items and the second rich content items to be provided as one or more answer rich content items comprises:

demoting the second rich content items in the order in the first set relative to the first rich content items in the first set wherein the rich content items in the first set are ranked according to a revised order;

selecting, from among the rich content items in the first set, one or more rich content items as the one or more answer rich content items, the selection based at least in part on the revised order; and providing the one or more answer rich content items with the answer to a user device from which the question query was received.

4. The computer implemented method of claim 3, wherein demoting the second rich content items in the order in the first set relative to the first rich content items in the first set comprises:

demoting each second rich content item in the first set in proportion to its ordinal position in the order in the other of the second or third set of rich content items in which it is included, wherein the lower the ordinal position the higher the relevance of the rich content item to the query.

5. The computer implemented method of claim 3, wherein demoting the second rich content items in the order in the first set relative to the first rich content items in the first set comprises:

demoting each second rich content item included in only one of the second set or third set by a first demotion factor; and demoting each second rich content item included in both the second set and third set by a second demotion factor that is less than the first demotion factor.

6. The computer implemented method of claim 3, wherein demoting the second rich content items in the order in the first set relative to the first rich content items in the first set comprises:

for each second rich content item included in only one of the second set or third set, demoting the second rich content item in the first set in proportion to its ordinal position in the order in the other of the second set or third of rich content items in which it is included, wherein the lower the ordinal position the higher the relevance of the rich content item to the query.

7. The computer implemented method of claim 6, wherein demoting the second rich content items in the order in the first set relative to the first rich content items in the first set comprises:

for each second rich content item included in both of the second set and third set, demoting the second rich content item in the first set in proportion to its highest of the ordinal positions in the orders in the second set and third sets, wherein the lower the ordinal position the higher the relevance of the rich content item to the query.

8. A method performed by data processing apparatus, the method comprising:

receiving, by a data processing apparatus, a query determined to be a question query and a corresponding answer generated in response to the question query, the answer determined to be responsive to the question query, wherein each of the question query and the answer has one or more terms;

generating, by the data processing apparatus, a contextual query that includes an element relating to the question query and an element relating to the answer;

submitting, by the data processing apparatus, the contextual query to a rich content search process and receiving data specifying a first set of rich content items responsive to the contextual query, the rich content items ranked according to an order that is indicative of the relevance of each rich content item to a query for which the set was generated;

determining, by the data processing apparatus, first rich content items in the first set of rich content items that meet a context condition that is indicative of a rich content item providing contextual information of both elements of the question query and the answer;

determining, by the data processing apparatus, second rich content items in the first set of rich content items that do not meet the context condition; and selecting rich content items from one or more of the first rich content items and the second rich content items, wherein the selected one or more rich content items are provided as one or more answer rich content items;

wherein determining first rich content items in the first set of rich content items meet a context condition that is indicative of an rich content item providing contextual information of both terms of the question and terms of the answer and second rich content items that do not meet the context condition comprises:

for each rich content item in the first set of rich content items, receiving data specifying rich content item labels for the rich content item;

determining each rich content item having labels that match terms of the answer and terms of the question query as a first rich content item; and determining each rich content item not having labels that match at least one terms of the answer and terms of the question query as a second rich content item;

wherein the rich content items are non-textual content.

9. A method performed by data processing apparatus, the method comprising:

receiving, by a data processing apparatus, a query determined to be a question query and a corresponding answer generated in response to the question query, the answer determined to be responsive to the question query, wherein each of the question query and the answer has one or more terms;

generating, by the data processing apparatus, a contextual query that includes an element relating to the question query and an element relating to the answer;

submitting, by the data processing apparatus, the contextual query to a rich content search process and receiving data specifying a first set of rich content items responsive to the contextual query, the rich content items ranked according to an order that is indicative of the relevance of each rich content item to a query for which the set was generated;

determining, by the data processing apparatus, first rich content items in the first set of rich content items that meet a context condition that is indicative of a rich content item providing contextual information of both elements of the question query and the answer;

determining, by the data processing apparatus, second rich content items in the first set of rich content items that do not meet the context condition; and selecting rich content items from one or more of the first rich content items and the second rich content items wherein the selected one or more rich content items are provided as one or more answer rich content items;

wherein determining first rich content items in the first set of rich content items meet a context condition that is indicative of an rich content item providing contextual information of both terms of the question and terms of the answer and second rich content items that do not meet the context condition comprises:

for each rich content item in the set of first rich content items, detecting entities depicted in the rich content item by use of rich content item processing;

determining each rich content item depicting entities that are described by both terms of the answer and terms of the question query as a first rich content item; and determining each rich content item depicting entities that are not described by both terms of the answer and terms of the question query as a second rich content item;

wherein the rich content items are non-textual content.

10. The method of claim 1, wherein the rich content items are images.

11. A system, comprising:

a data processing apparatus; and a computer readable memory system in data communication with the data processing apparatus and storing instructions executable by the data processing apparatus and that upon such execution cause the data processing apparatus to perform operations comprising:

receiving a query determined to be a question query and a corresponding answer generated in response to the question query, the answer determined to be responsive to the question query, wherein each of the question query and the answer has one or more terms;

generating a contextual query that includes an element relating to the question query and an element relating to the answer;

submitting the contextual query to a rich content search process and receiving data specifying a first set of rich content item responsive to the contextual query, the rich content items ranked according to an order that is indicative of the relevance of each rich content item to a query for which the set was generated, the submitting comprising submitting each of the question query, the answer, and the contextual query to the rich content item search process and receiving data specifying the first set of rich content items responsive to the contextual query, a second set of rich content items responsive to the question query, and a third set of rich content items responsive to the answer, wherein each set of rich content items differs from each other respective set of rich content items, and the rich content items in each set of rich content items are ranked according to an order that is indicative of the relevance of each rich content item to a query for which the set was generated;

determining first rich content items in the first set of rich content items that meet a context condition that is indicative of a rich content item providing contextual information of both elements of the question query and the answer, query, the determining first rich content items comprising determining from the data specifying the first, second and third sets of rich content items, first rich content items in the first set that that are not included in both of the second set and the third set and second rich content items in the first set that are included in at least one of the second set or third set;

determining second rich content items in the first set of rich content items that do not meet the context condition; and selecting rich content items from one or more of the first rich content items and the second rich content items, wherein the selected one or more rich content items are provided as one or more answer rich content items;

wherein the rich content items are non-textual content.

12. The system of claim 11, wherein:

generating a contextual query that includes an element relating to the question query and an element relating to the answer comprises generating a context query that includes at least one or more terms from the question query and one or more terms from the answer;

the context condition that is indicative of an image providing contextual information of both elements of the question query and the answer is a condition that is indicative of an image providing contextual information of terms of the question query and terms of the answer;

and the rich content items are images.

13. The system of claim 12, wherein selecting rich content items from one or more of the first rich content items and the second rich content items to be provided as one or more answer rich content items comprises:

demoting the second images in the order in the first set relative to the first images in the first set wherein the images in the first set are ranked according to a revised order;

selecting, from among the images in the first set, one or more images as one or more answer images, the selection based at least in part on the revised order;

providing the one or more answer images with the answer to a user device from which the question query was received, the selection based at least in part on the revised order.

14. The system of claim 13, wherein demoting the second images in the order in the first set relative to the first images in the first set comprises:
demoting each second image in the first set in proportion to its ordinal position in the order in the other of the second or third set of images in which it is included, wherein the lower the ordinal position the higher the relevance of the image to the query.

15. The system of claim 13, wherein demoting the second images in the order in the first set relative to the first images in the first set comprises:
demoting each second image included in only one of the second set or third set by a first demotion factor; and
demoting each second image included in both the second set and third set by a second demotion factor that is less than the first demotion factor.

16. The system of claim 13, wherein demoting the second images in the order in the first set relative to the first images in the first set comprises:
for each second image included in only one of the second set or third set, demoting the second image in the first set in proportion to its ordinal position in the order in the other of the second set or third of images in which it is included, wherein the lower the ordinal position the higher the relevance of the image to the query.

17. The system of claim 16, wherein demoting the second images in the order in the first set relative to the first images in the first set comprises:
for each second image included in both of the second set and third set, demoting the second image in the first set in proportion to its highest of the ordinal positions in the orders in the second set and third sets, wherein the lower the ordinal position the higher the relevance of the image to the query.

18. A system, comprising:
a data processing apparatus; and
a computer readable memory system in data communication with the data processing apparatus and storing instructions executable by the data processing apparatus and that upon such execution cause the data processing apparatus to perform operations comprising:
receiving a query determined to be a question query and a corresponding answer generated in response to the question query, the answer determined to be responsive to the question query, wherein each of the question query and the answer has one or more terms;
generating a contextual query that includes an element relating to the question query and an element relating to the answer;
submitting the contextual query to an image search process and receiving data specifying a first set of images responsive to the contextual query, the images ranked according to an order that is indicative of the relevance of each image to a query for which the set was generated;
determining first images in the first set of images that meet a context condition that is indicative of an image providing contextual information of both elements of the question query and the answer, query;
determining second images in the first set of images that do not meet the context condition; and
selecting one or more images from one or more of the first images and the second images, wherein the selected images are provided as one or more answer images;
wherein determining first images in the first set of images meet a context condition that is indicative of an image providing contextual information of both terms of the question and terms of the answer and second images that do not meet the context condition comprises:
for each image in the set of first images, receiving data specifying image labels for the image;
determining each image having labels that match terms of the answer and terms of the question query as first images; and
determining each image not having labels that match at least one terms of the answer and terms of the question query as second images.

19. A computer readable memory apparatus storing instructions executable by a data processing apparatus and that upon such execution cause the data processing apparatus to perform operations comprising:
receiving a query determined to be a question query and a corresponding answer generated in response to the question query, the answer determined to be responsive to the question query, wherein each of the question query and the answer has one or more terms;
generating a contextual query that includes an element relating to the question query and an element relating to the answer;
submitting the contextual query to a rich content search process and receiving data specifying a first set of rich content items responsive to the contextual query, the rich content items ranked according to an order that is indicative of the relevance of each rich content item to a query for which the set was generated;
determining first rich content item in the first set of rich content items that meet a context condition that is indicative of a rich content item providing contextual information of both elements of the question query and the answer;
determining second rich content items in the first set of rich content items that do not meet the context condition and
selecting rich content items from one or more of the first rich content items and the second rich content items, wherein the selected one or more rich content items are provided as one or more answer rich content items;
wherein determining first rich content items in the first set of rich content items meet a context condition that is indicative of an rich content item providing contextual information of both terms of the question and terms of the answer and second rich content items that do not meet the context condition comprises:
for each rich content item in the first set of rich content items, receiving, data specifying rich content item labels for the rich content item;
determining each rich content item having labels that match terms of the answer and terms of the question query as a first rich content item; and
determining each rich content item not having labels that match at least one terms of the answer and terms of the question query as a second rich content item;
wherein the rich content items are non-textual content.

* * * * *